United States Patent Office 3,580,777
Patented May 25, 1971

3,580,777
METHOD OF BONDING ASBESTOS SHEET MATERIAL TO CONCRETE
Rowland S. Hartzell, Gibsonia, Pa., and Gene Gerek, Oswego, Ill., assignors to PPG Industries, Inc., Pittsburgh, Pa.
No Drawing. Continuation-in-part of application Ser. No. 528,347, Feb. 18, 1966. This application Dec. 2, 1968, Ser. No. 780,587
Int. Cl. B23b *31/00*
U.S. Cl. 156—278        8 Claims

ABSTRACT OF THE DISCLOSURE

Composite coated concrete articles having a surface coating of a cured or other resinous material comprise a cementitious base and adherently bonded thereto a layer of asbestos sheet material which is coated with an organic coating. Such articles can be obtained by curing the cementitious base while in contact with the uncoated side of pre-coated asbestos sheet material to produce concrete articles in which the coated asbestos sheet material is directly bonded to the concrete with exceptional adhesion.

---

This application is a continuation-in-part of copending application Ser. No. 528,347, filed Feb. 18, 1966 now abandoned.

In the past, concrete and similar materials have been coated with organic coating compositions but the methods employed have usually required the coating composition to be applied to cured or uncured cementitious material with the coating then being dried or cured after contact to effect a bond to the cementitious material. Thus, in some processes, a liquid coating composition is applied to a cured concrete block and the coating is cured to produce the finished coated block. In other methods both components are contacted while in an uncured state and subsequently cured. Such coating procedures are in large part necessitated by the fact that dried or cured resinous compositions will not satisfactorily bond to either cured or uncured cementitious material. Consequently, in order to obtain suitable adhesion, the curing of the resin is carried out only while the resin is in contact with the cementitious material.

This requirement is especially disadvantageous in the concrete coating art because of the unwieldy nature of the completed product. In many areas of construction the cementitious material is cured at the construction site and the coating must also be cured at that location. Although other concrete materials, such as, for example, concrete blocks, can be adapted to more feasible coating procedures, such as those usually employed with metals, the sheer bulk of concrete requires extensive alteration of most conventional coating operations. This disadvantage is especially significant with respect to thermosetting or other resins which require high-temperature baking and cannot be otherwise applied to concrete.

It has been discovered that coated concrete articles can be prepared by first applying an organic coating to one side of asbestos sheet material and subsequently curing the cementitious material while in contact with the uncoated side of the asbestos sheet material. Surprisingly, the coated asbestos sheet material, exhibits excellent adhesion to the cured cementitious material, without the need for an intermediate adhesive, resulting in a completely protected concrete product in which the asbestos sheet material is in direct adherent contact with the concrete. Thus, concrete coatings can be prepared by a method which permits the curing or hardening of the coating prior to the contacting operation, thereby eliminating the disadvantages inherent in present concrete coating methods and allowing the preparation of concrete coatings based on either thermosetting or thermoplastic resins.

One of the most important advantages gained by the method of this invention, and one which is directly related to the elimination of the requirement that any curing of the coating be effected while the organic coating and cementitious material are in contact, is that resins which require baking can be easily employed to produce highly resistant baked-type finishes. This permits the use of thermosetting resins or resins which require heat for fusion, such as vinyl plastisols or organosols. Asbestos sheet material possesses good heat stability and thus can be coated and baked at high temperature without any structural impairment of the sheet. After fusion or curing of the coating, the sheet is contacted with cementitious material, for example, by means of a wet concrete mold, with bonding resulting upon curing of the cementitious material.

Thermoplastic coatings can also be more easily applied since, as with the thermosetting coatings, all of the coating operations usually employed with metals, such as, for example, roll coating, dip coating, or lamination, are applicable and the coating can be dried or fused at elevated temperatures, if desired. Consequently, alternative coating methods are available, thereby permitting a wider choice to fulfill specific construction needs.

Moreover, the adhesion of the coating to the concrete, considering the asbestos sheet material and organic coating as a whole, is exceptionally strong because of the excellent adhesion which is found to exist between the concrete and the asbestos sheet as well as between the organic layer and the asbestos sheet. The excellent bonding of the asbestos sheet material to the concrete is believed to be the result of a chemical bond between the two materials. Such assumption appears highly probable in view of the well-known affinity between asbestos and concrete.

Asbestos sheet material has been used in other coatings but primarily to impart properties such as flexibility and impact-resistance and has been embedded in the coating to achieve this purpose. Although in this invention the asbestos sheet material serves a new primary function, that of bonding the coating to the concrete, it still provides the same above-described properties which occasion its sole use in other coatings.

The method of this invention may be employed to coat a great number of concrete products such as, for example, conventional concrete blocks, sanitary or chemical waste-carrying concrete ducts, and concrete swimming pools. Because of the decorative properties which may be obtained by a proper selection of resins, the method may also be employed where esthetic finishes are desired.

The organic coating component of this invention can be selected from a broad group of both thermoplastic and thermosetting resins, depending upon the conditions to which the completed structure is subjected. Where flexibility is a primary property, thermoplastic resins may be employed, whereas if high temperature resistance or hardness is of greater importance, a thermosetting resin may be used. Blends of the two types of resins can also be used where desirable.

Among the various resins which are the most useful for this invention are:

Halogenated vinyl resins.—Vinyl halide resins, such as poly(vinyl chloride), poly(vinyl fluoride) and interpolymers of vinyl halides with copolymerizable monomers such as vinyl acetate. Also included are vinylidene halide resins, such as poly(vinylidene chloride) and poly(vinylidene fluoride), as well as perhalogenated polymer resins, such as poly(tetrafluoroethylene) and poly(chlorotrifluoroethylene).

Alkyd resins.—This group includes the well-known oil-modified glyceryl phthalate resins as well as any of the saturated or unsaturated alkyd resins utilized in the coatings field, produced from any polybasic acid and polyfunctional acids as phthalic acid, maleic acid, fumaric acid, isophthalic acid, and the like, as well as from anhydrides of such acids. The polyfunctional alcohol can be, for example, glycerine, sorbitol, ethylene glycol and diethylene glycol and similar polyols.

Hydrocarbon resins.—Included here are polyethylene, polypropylene, polybutadiene, polyisobutylene and polystyrene resins, as well as interpolymers of the same, such as polyethylene-propylene and polyethylene-propylene diene resins.

Acrylic resins.—This group includes the thermoplastic acrylics such as the polymers and copolymers of the esters of acrylic and methacrylic acids and especially the class of hydroxyl-modified acrylic polymers combined with melamine resins. Representative of this latter resin is the combination of melamine resin with an interpolymer comprising styrene, 2-ethylhexyl acrylate, methyl methacrylate, butyl methacrylate, hydroxyethyl methacrylate, hydroxypropyl methacrylate and methacrylic acid.

Also, thermosetting acrylics such as acrylamide-modified acrylic resins with crosslinking functional groups supplied in part by methylol or alkoxy-methyl groups are especially useful. Examples of this class are listed in U.S. Patent No. 3,037,963.

Amino resins.—Included within this group are amine-aldehyde resins; that is, the aldehyde condensation product of melamine, urea, acetoguanamine, or a similar compound. Generally, the aldehyde employed is formaldehyde, although the products can be made from other aldehydes, such as acetaldehyde, benzaldehyde and others. While resins produced from melamine or urea are most common and are preferred, condensation products of other amines or amides can also be employed, for example, that of triazines, diazines, guanamines, and alkyl and aryl-substituted derivatives of such compounds, including alkyl and aryl-substituted ureas and alkyl and aryl-substituted melamine, provided at least one amino group is present. Some examples of such compounds are N,N'-dimethyl urea, benzyl urea, ammeline, triaminopyrimidine, 2,4,6-triphenyl triamino-1,3,5-triazine, and the like.

Epoxy resins.—This group includes the well-known epoxy resins obtained by reaction of polyphenols with epichlorohydrin, such as, for example, the product of the reaction of 2,2-bis(4-hydroxyphenyl)propane and epichlorohydrin. Also useful are reaction products of epichlorohydrin and a low molecular weight condensation product of formaldehyde and a phenol of alkylphenol, commercially known as Novolak resins.

Polyester resins.—This class includes materials made from glycols such as propylene glycol, diethylene glycol and dipropylene glycol, unsaturated acids and anhydrides, such as maleic anhydride and fumaric acid, monomers such as styrene, vinyl toluene and methyl methacrylate and saturated acids such as isophthalic and adipic acid.

Organopolysiloxane resins.—This group includes methyl and phenyl organopolysiloxane resins, such as dimethyltriphenyltrimethoxytrisiloxane, as well as all those represented by the general unit formula:

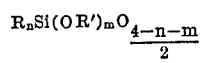

$$R_nSi(OR')_mO_{\frac{4-n-m}{2}}$$

where R is a monovalent organic radical bonded to silicon bond and R' is hydrogen, an alkyl radical, an aryl radical, or an acyl radical. The value of $n$ in the above formula is between about 0.5 and 1.9 and the value of $m$ is between 0.01 and 2.5; the value of $m$ plus $n$ is between 0.51 and 3.

Phenolic resins.—This group includes phenol-formaldehyde resins such as those made from phenol, cresol and xylenol and substituted phenols such as p-phenylphenol and p-tertiary-amylphenol, rosin and terpene-modified phenolics.

It is also often advantageous to use compatible combinations of the above thermosetting and thermoplastic resins, such as, for example, combinations of aldehyde-modified, unsaturated carboxylic acid amide resins and poly(vinylidene fluoride) resins.

The resinous polymers employed as the organic coating herein can be utilized in bulk or preformed film form, or as solutions or dispersions in organic solvents or water. The method of application to the asbestos sheet material depends upon the particular resin used and the form in which it is employed.

The asbestos sheet material of this invention comprises a layer of material containing asbestos in a major proportion. Such layer may be woven and non-woven asbestos cloth, bonded asbestos fiber fabrics, asbestos paper and similar layers which can be coated with organic coating composition and subsequently bonded to concrete.

The term asbestos does not refer to a distinct mineral species, but is a commercial term applied to fibrous varieties of several minerals differing widely in composition, strength and flexibility.

Chemical and mineralogical studies show that asbestos is of mineral origin, of which the most abundant variety is chrysotile. Other varieties are crocidolite, amosite, anthophyllite, termolite and actinolite. The chrysotile is classified as being of the serpentine family whereas the others are of the amphibole family. The chemical feature common to all asbestos is that they are hydrated silicates with the degree of hydration varying from about 1 percent in some types to as much as about 14 percent in most kinds of chrysotile. It is generally accepted that asbestos is a metamorphic product derived from certain types of silica-bearing minerals. Asbestos is generally as dense as the rock in which it occurs but forms masses of fibers. Specific gravity of the fibers range from 2.5 for chrysotile to 3.3 for the other types. Asbestos can be subdivided into fibers so fine that only the electron microscope will reveal them. The finest fibers are found in chrysotile. Its basic single fiber is a smooth cylinder approximately 180 A. in diameter (0.00000071 inch).

Asbestos cloths comprise a wide selection of styles, textures, weights and thicknesses. In woven asbestos, the most commonly used weaves are: plain, herringbone, twill and broken twill. The quality or grade of asbestos cloths, determined by the percent asbestos content, may also vary and includes a commercial grade of between 75 and 80 percent asbestos, as well as Grade AAAA, which contains up to 100 percent asbestos. Varying chemical and physical properties, such as heat resistance and solvent resistance, can be obtained by combining asbestos with other fibers and materials, including cellulose acetate fibers, glass fibers, and brass wire.

Non-woven asbestos cloths are made from yarns of asbestos bonded together at right angles. A number of binders are available, such as natural and synthetic rubbers, plastics such as polyinvyl chloride, synthetic resins, and various gums and glues.

Bonded fiber fabrics comprise a random arrangement of the asbestos fibers. Bonding may be achieved by the use of thermoplastic fibers either alone or blended with non-thermoplastic fibers. They can be heat-treated with suitable solvents to cause mutual adhesion. Alternatively, the various asbestos fibers may be bonded together by addition of bonding agents, as employed in the non-woven cloths.

Asbestos paper is prepared using equipment and production techniques closely resembling those of ordinary cellulose paper making. High purity asbestos paper, consisting entirely of asbestos fiber may be used although preferably a binder, as above, is employed for reinforcement. Other materials may be combined with the asbestos, analogous to the asbestos cloth substituents, such as thermosetting and thermoplastic resins, glass cloth, and asphalt.

There may also be employed asbestos sheet material in which a layer of another substance, such as glass fibers or other reinforcement, is interposed between layers of asbestos.

The cementitious material of this invention includes any composition containing cement which, when combined with water, sets or cures to a hard mass. The cement can be any compound or mixture of compounds, usually calcareous or argillaceous, which interact with water to form a cohesive product. The common types of such cements include gypsum, common lime, hydraulic limes, Pozzolan, natural cement, portland cement, magnesite cement, aluminous cement, slag cement, and the like. Except where the cementitious material is used as a plaster, stucco or in a similar application, the cementitious composition generally includes gravel, sand, cinders, slag or similar materials, termed the aggregate. These are embedded in a matrix of the cement, and when the mixture is combined with water, it sets to a strong, hard, unified mass often called concrete.

Compositions containing portland cement are the preferred cementitious materials utilized in the invention, although other compositions containing other cements and mortars are also used for certain purposes. Also, compositions containing various types of aggregates can be utilized, including those which cure to the products known as lightweight concrete, perlite concrete, pumice concrete, cinder concrete, and shale aggregate concrete.

Organic coatings can be bonded to the cementitious base, according to this invention, by very uncomplicated means. Films can be heat bonded or laminated to the asbestos, with or without an adhesive or added binder. Liquid coating compositions can be applied to the asbestos sheet material by a variety of methods such as, for example, brushing, spraying, roll coating, or the like. When drying or baking of the coating is desired, or when a thermosetting resin is employed, the asbestos sheet material is then heated to the desired temperature, for instance, to about 500° F. to 300° F. for 1 to 30 minutes, respectively. After the coating has cured, dried or fused, as desired, the coated sheet material is brought into contact with uncured concrete as, for example, by lining a wet concrete mold with the sheet. Wet concrete is then poured into the mold, cured, and the coated asbestos sheet material forms a permanent bond with the concrete. It is preferred that the concrete be cured at a slow rate in order to obtain maximum adherence.

There are set forth below several examples which illustrate the nature and properties of the coating compositions of the invention. However, the invention should not be considered as being limited to their details. All parts and percentages are by weight and are based on resin solids content, unless otherwise specified.

EXAMPLE 1

A coating composition was prepared employing poly(vinylidene fluoride) and an acrylamide interpolymer, according to the following formulation:

| | Parts by weight |
|---|---|
| Poly(vinylidene fluoride) | 77 |
| Acrylamide interpolymer | 10 |
| Butyrolactone | 30 |
| Carbitol acetate | 55 |
| Isophorone | 30 |
| Titanium dioxide (pigment) | 36 |

The poly(vinylidene fluoride) has a melting point interval of 160° C. to 165° C. and a high molecular weight as indicated by its plasticity number of 3020. The "plasticity number" is an empirical index indicating relative molecular weight and is used because of the difficulty of obtaining a true solution of the polymer in order to make absolute molecular weight determinations.

The amide interpolymer contains the following monomers:

| | Parts by weight |
|---|---|
| Acrylamide | 92.0 |
| Methacrylic acid | 46.0 |
| Acrylonitrile | 368.0 |
| Ethyl acrylate | 1335.0 | and was prepared as taught in U.S. Patent No. 3,037,963.

The pigment, titanium dioxide, was dispersed in the combined mixture by means of a pebble mill in a pigment-to-binder ratio of 0.42/1.

The resultant coating composition was applied in a 1 mil thickness (after bake) by means of a 3 mil drawdown bar to .016 grade asbestos paper having the following properties:

| Property | Value | Test method |
|---|---|---|
| Weight (lbs./100 square feet) | 8.5 | ASTM D 646 [1] |
| Density (lbs./cu. ft.) | 65 | ASTM D 1170 |
| Tensile strength (lbs./in.) | 30 | ASTM D 828 |

[1] American Society for Testing Materials.

The composition was then cured at 500° F. for 3 minutes upon which the coating adhered to the asbestos paper.

The coated asbestos paper was then placed face down in a mold and a 1.0 inch of portland cement concrete pre-mix, containing cement, sand and gravel in a 1:2:3 ratio, was poured over the asbestos paper. After a 3-day cement cure, the coated asbestos was firmly bonded to the concrete.

EXAMPLE 2

A coating composition was prepared employing poly(vinyl fluoride) and an acrylamide interpolymer in equal proportions.

The acrylamide interpolymer contained the following monomers.

| | Parts by weight |
|---|---|
| Acrylamide | 10 |
| Methyl methacrylate | 30 |
| Styrene | 27.5 |
| Methacrylic acid | 2.5 |
| Butyl acrylate | 30 | and was prepared as taught in U.S. Patent No. 3,037,963.

The poly(vinyl fluoride) had a specific gravity of 1.4 and a particle size of from 0.8 to 3.0 microns.

A pigment, titanium dioxide, was dispersed in the above composition by means of a pebble mill in a pigment-to-binder ratio of 0.42/1.

The resulting coating composition was then applied in a 1 mil thickness by means of a 3 mil drawdown bar to .016 grade asbestos paper (as used in Example 1).

The composition was cured at 500° F. for 3 minutes and the coating was thus bonded firmly to the asbestos paper.

The coated asbestos paper was placed face down in a mold and portland cement concrete (as in Example 1) was poured over the asbestos paper. A slow cure was conducted which consisted of spraying water over the block for a 3-day period. After this interval, the coated asbestos paper exhibited excellent adhesion to the concrete.

A water immersion test was run by which the coated concrete block was completely submerged in water for a 2-month period. The adhesion of the coating to the concrete was unimpaired after completion of the test.

EXAMPLE 3

A coating composition was prepared employing an organosol of the following composition:

| | Parts by weight |
|---|---|
| Paste | 254.8 |
| Epoxidized soybean oil | 1.9 |
| Vinyl chloride copolymer [1] | 53.3 |
| Acrylic resin | 57.2 |

[1] 86 percent vinyl chloride, 13 percent vinyl acetate, 1 percent maleic acid, intrinsic viscosity 0.53 in cyclohexane at 20° C.

The above paste consisted of:

| | Parts by weight |
|---|---|
| Vinyl chloride copolymer (as above) | 156.0 |
| Diisobutyl ketone | 216.0 |
| High-boiling aromatic hydrocarbon solvent (B.P. range 187–205° C.) | 508.0 |
| High-boiling aromatic hydrocarbon solvent (B.P. range 160–173° C.) | 255.0 |
| Adipic acid-propylene glycol polyester | 247.2 |
| Poly(vinyl chloride) (dispersing grade) | 624.0 |
| Antimony oxide | 87.0 |
| Titanium dioxide | 789.0 |

The acrylamide interpolymer contained the following monomers:

| | Parts by weight |
|---|---|
| Acrylamide | 15.0 |
| Methacrylic acid | 2.5 |
| Styrene | 38.5 |
| Methyl methacrylate | 44.0 | and was prepared as taught in U.S. Patent No. 3,037,963.

The resultant coating composition was applied to asbestos paper (as used in Example 1) by means of a 3 mil drawdown bar in a 1 mil thickness, after bake. A second 1 mil thickness was also applied after curing of the first coat. The cure schedule in both bakes was 500° F. for 3 minutes.

The coated asbestos paper was then placed face down in a wood mold 4 inches deep by 6 inches long by 4 inches wide and concrete, as used in Example 1, was poured over. The cement was cured by spraying water over the block for a 3-day period. The blocks were then kept damp by means of wet rags for a period of 2 weeks and removed from the mold. Adhesion of the coating was found to be very excellent.

EXAMPLE 4

A coating composition was prepared employing a plastisol of the following composition:

| | Parts by weight |
|---|---|
| Vinyl chloride polymer (dispersion) | 580 |
| Epoxidized soybean oil | 11 |
| Diisodecyl phthalate | 175 |
| Titanium dioxide | 14 |
| Antimony oxide | 10 |
| Barium sulfate (barytes) | 37 |

Heat and light stabilizers were added, consisting of 11 parts by weight barium-cadmium and 6 parts by weight of zinc, as well as a phthalate plasticizer (known commercially as Santicizer 214).

The resultant coating composition was applied to asbestos paper (as used in Example 1) by means of a 10 mil drawdown bar to produce cured film of 10 mil thickness. The composition was fused by heating at 375° F. for 10 minutes.

The coated asbestos paper was then placed face down in a wood mold 4 inches deep by 4 inches wide by 6 inches long and concrete, as used in Example 1, was poured over. The cement was cured by spraying water over the block for a 3-day period. Adhesion of the coating was found to be excellent.

A water immersion test was conducted by which the coated concrete block was completely submerged in water for a 3-month period. An outdoor exposure test was also run over the same time period to determine weathering ability of the coating. No coating failure was found after both tests.

According to the provisions of the patent statutes, there are disclosed above the invention and what are now considered to be its best embodiments. However, it is to be understood that, within the scope of the appended claims, the invention may be practiced otherwise than as specifically described.

We claim:
1. A method of producing a composite concrete article which comprises curing a cementitious concrete composition while in contact with the uncoated side of asbestos sheet material having on one side thereof an adherent organic coating, whereby the coated asbestos sheet material is bonded to be cured concrete base.
2. The method of claim 1 in which said asbestos sheet material is asbestos paper.
3. The method of claim 1 in which said organic coating comprises one or more resins selected from the group consisting of halogenated vinyl resins, alkyd resins, hydrocarbon resins, acrylic resins, amino resins, epoxy resins, organopolysiloxane resins and phenolic resins.
4. The method of claim 1 in which said organic coating comprises poly(vinylidene fluoride).
5. The method of claim 1 in which said organic coating comprises poly(vinyl chloride).
6. A method of producing a composite coated concrete article which comprises coating one side of asbestos sheet material with an organic coating composition, heating the coated sheet material to cure or fuse said coating composition and curing a concrete composition while in contact with the uncoated side of said asbestos sheet material.
7. The method of claim 6 in which said organic coating composition comprises a thermosetting resin.
8. The method of claim 6 in which said organic coating composition comprises an aldehyde-modified interpolymer of an unsaturated carboxylic acid amide and at least one other copolymerized ethylenic monomer.

References Cited

UNITED STATES PATENTS

| | | | |
|---|---|---|---|
| 2,918,442 | 12/1959 | Gerrard et al. | 156—333X |
| 2,981,650 | 4/1961 | Bader | 156—333X |
| 3,230,842 | 1/1966 | Denton et al. | 156—330X |
| 3,297,515 | 1/1967 | Regenstein et al. | 156—334X |

BENJAMIN R. PADGETT, Primary Examiner

S. J. LECHERT, JR., Assistant Examiner

U.S. Cl. X.R.

156—71, 322; 161—205